United States Patent
Kawaguchi

(10) Patent No.: US 11,916,506 B2
(45) Date of Patent: Feb. 27, 2024

(54) MOTOR CONTROL DEVICE

(71) Applicant: DENSO CORPORATION, Kariya (JP)

(72) Inventor: Yusaku Kawaguchi, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/862,750

(22) Filed: Jul. 12, 2022

(65) Prior Publication Data

US 2023/0029149 A1 Jan. 26, 2023

(30) Foreign Application Priority Data

Jul. 14, 2021 (JP) .................................. 2021-116263

(51) Int. Cl.
*H02P 29/024* (2016.01)
*H02P 27/06* (2006.01)

(52) U.S. Cl.
CPC ............ *H02P 29/024* (2013.01); *H02P 27/06* (2013.01)

(58) Field of Classification Search
CPC ................................ H02P 29/024; H02P 27/06
See application file for complete search history.

(56) References Cited

U.S. PATENT DOCUMENTS

| | | | | |
|---|---|---|---|---|
| 9,742,322 | B2* | 8/2017 | Rethinam | .................. H02P 6/14 |
| 2017/0310265 | A1* | 10/2017 | Matsuura | .................. H02P 6/16 |
| 2018/0102719 | A1 | 4/2018 | Oka et al. | |
| 2018/0229764 | A1* | 8/2018 | Sugawara | ................ B62D 6/10 |
| 2021/0075337 | A1* | 3/2021 | Tobayashi | ............. H02M 7/487 |
| 2021/0218328 | A1* | 7/2021 | Eguchi | ..................... H02M 1/44 |
| 2022/0200500 | A1* | 6/2022 | Hayasaka | ............... H02P 27/08 |
| 2022/0345066 | A1* | 10/2022 | Furukawa | ............. H02P 25/022 |
| 2022/0396155 | A1* | 12/2022 | Tanooka | .................. B60T 8/172 |
| 2023/0087179 | A1* | 3/2023 | Gallert | .................... H02P 29/60 |
| | | | | 310/180 |

* cited by examiner

*Primary Examiner* — Zoheb S Imtiaz
(74) *Attorney, Agent, or Firm* — Nixon & Vanderhye P.C.

(57) ABSTRACT

A motor control device includes a motor, a drive circuit, a current detection unit, and a control unit. The motor has a plurality of phases of motor windings. The drive circuit is provided on a low potential side of the motor windings. The current detection unit has current detection resistors corresponding to each phase, and is provided on a low potential side of the drive circuit. The control unit includes an actuator control unit and an abnormality diagnosis unit. The abnormality diagnosis unit determines that the current detection unit is abnormal, when a difference between a maximum current, which is a maximum value of the phase current when a same duty ratio is commanded to each phase, and a minimum current, which is a minimum value of the phase current when a same duty ratio is commanded to each phase, is equal to or greater than an abnormality determination threshold.

6 Claims, 6 Drawing Sheets

MOTOR CONTROL DEVICE

CROSS REFERENCE TO RELATED APPLICATION

The present application is based on Japanese Patent Application No. 2021-116263 filed on Jul. 14, 2021, disclosure of which is incorporated herein by reference.

TECHNICAL FIELD

The present disclosure relates to a motor control device.

BACKGROUND

Conventionally, a motor control device for diagnosing an abnormality of a current sensor that detects a current of a three-phase motor is known.

SUMMARY

An object of the present disclosure is to provide a motor control device capable of appropriately detecting an abnormality in a current detection unit.

A motor control device of the present disclosure includes a motor, a drive circuit, a current detection unit, and a control unit. The motor has a multi-phase motor winding. The drive circuit has drive elements corresponding to each phase of the motor winding, and is provided on either a low potential side or a high potential side of the motor winding. The current detection unit has current detection resistors corresponding to each phase of the motor winding, and is provided on a low potential side of the drive circuit provided on the low potential side of the motor winding, or on a high potential side of the drive circuit provided on the high potential side of the motor winding.

The control unit has an actuator control unit and an abnormality diagnosis unit. The actuator control unit controls a drive of the motor by controlling an on/off operation of the drive element. The abnormality diagnosis unit diagnoses an abnormality in the current detection unit.

DETAILED DESCRIPTION

In an assumable example, a motor control device for diagnosing an abnormality of a current sensor that detects a current of a three-phase motor is known. An abnormality of the current sensor is detected based on a comparison between a three-phase current and a bus current.

If the sum of the currents flowing in all the phases is not known, the abnormality of each phase cannot be detected. Therefore, it is necessary to separately provide a current sensor for detecting the bus current.

The present disclosure has been made in view of the above-mentioned problems, and an object of the present disclosure is to provide a motor control device capable of appropriately detecting an abnormality in a current detection unit.

A motor control device of the present disclosure includes a motor, a drive circuit, a current detection unit, and a control unit. The motor has a multi-phase motor winding. The drive circuit has drive elements corresponding to each phase of the motor winding, and is provided on either a low potential side or a high potential side of the motor winding. The current detection unit has current detection resistors corresponding to each phase of the motor winding, and is provided on a low potential side of the drive circuit provided on the low potential side of the motor winding, or on a high potential side of the drive circuit provided on the high potential side of the motor winding.

The control unit has an actuator control unit and an abnormality diagnosis unit. The actuator control unit controls a drive of the motor by controlling an on/off operation of the drive element. The abnormality diagnosis unit diagnoses an abnormality in the current detection unit.

In a first aspect, the abnormality diagnosis unit determines that the current detection unit is abnormal when a difference between a maximum value and a minimum value of a phase current when a same duty ratio is commanded to each phase is equal to or more than an abnormality determination threshold value. As a result, the abnormality of the current detection unit can be appropriately detected.

In a second aspect, the abnormality diagnosis unit determines that the current detection unit is abnormal when a difference between a maximum value and a minimum value of a phase current when a same current command value is commanded to each phase and a current feedback control is performed is equal to or larger than an abnormality determination threshold value. As a result, the abnormality of the current detection unit can be appropriately detected.

Hereinafter, a motor control device according to the present disclosure will be described with reference to the drawings. Hereinafter, in a plurality of embodiments, a substantially equivalent configuration will be denoted by an identical reference, and explanation thereof will be omitted.

First Embodiment

Figure 1:
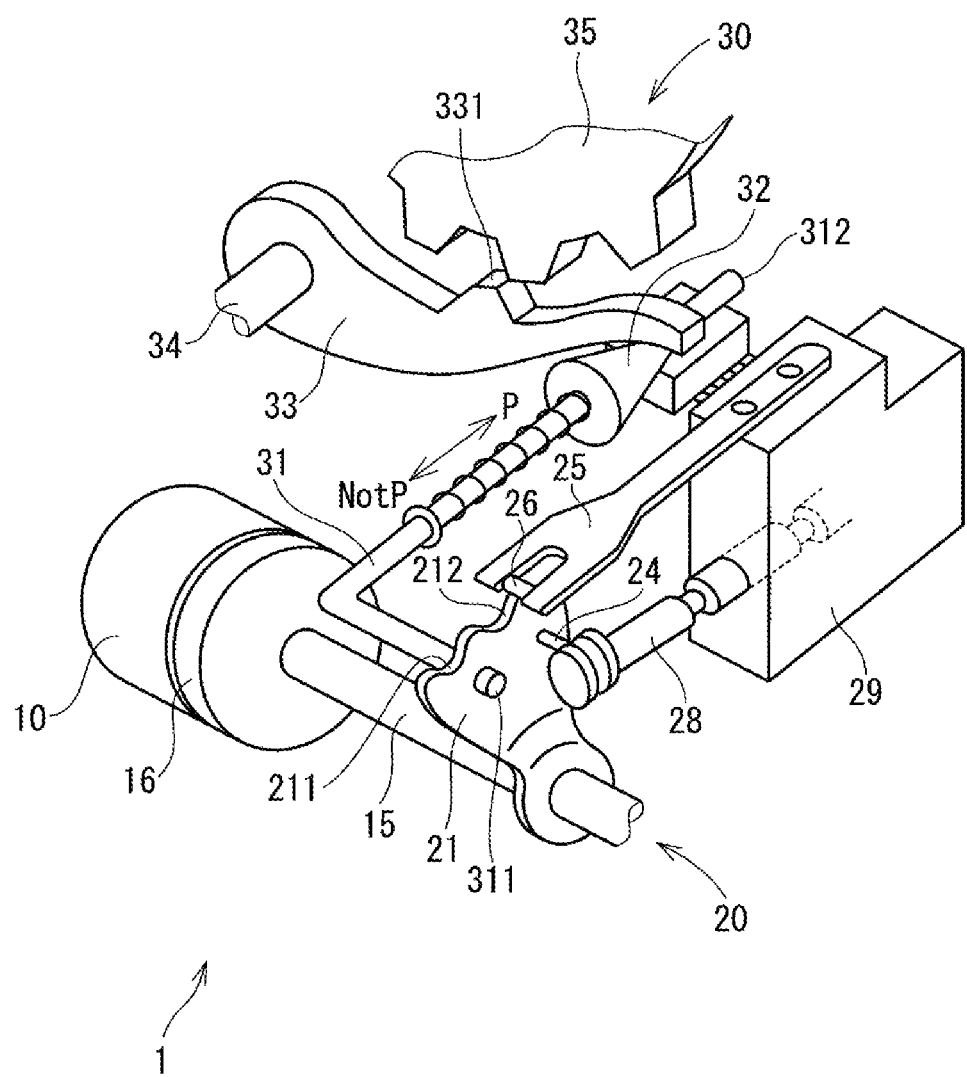
FIG. 1 is a perspective view showing a shift-by-wire system according to a first embodiment.
Figure 2:
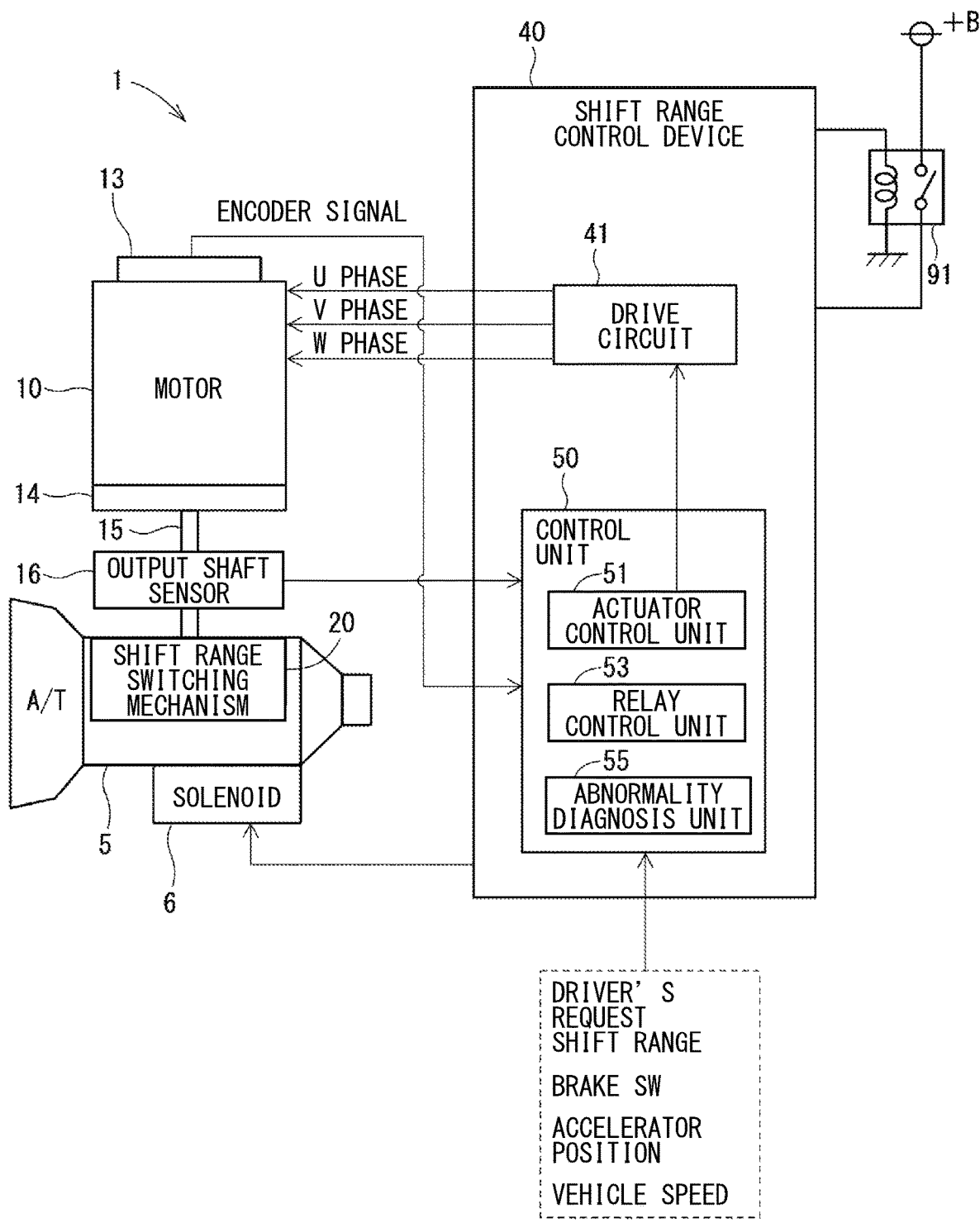
FIG. 2 is a schematic configuration diagram showing the shift-by-wire system according to the first embodiment.
Figure 3:
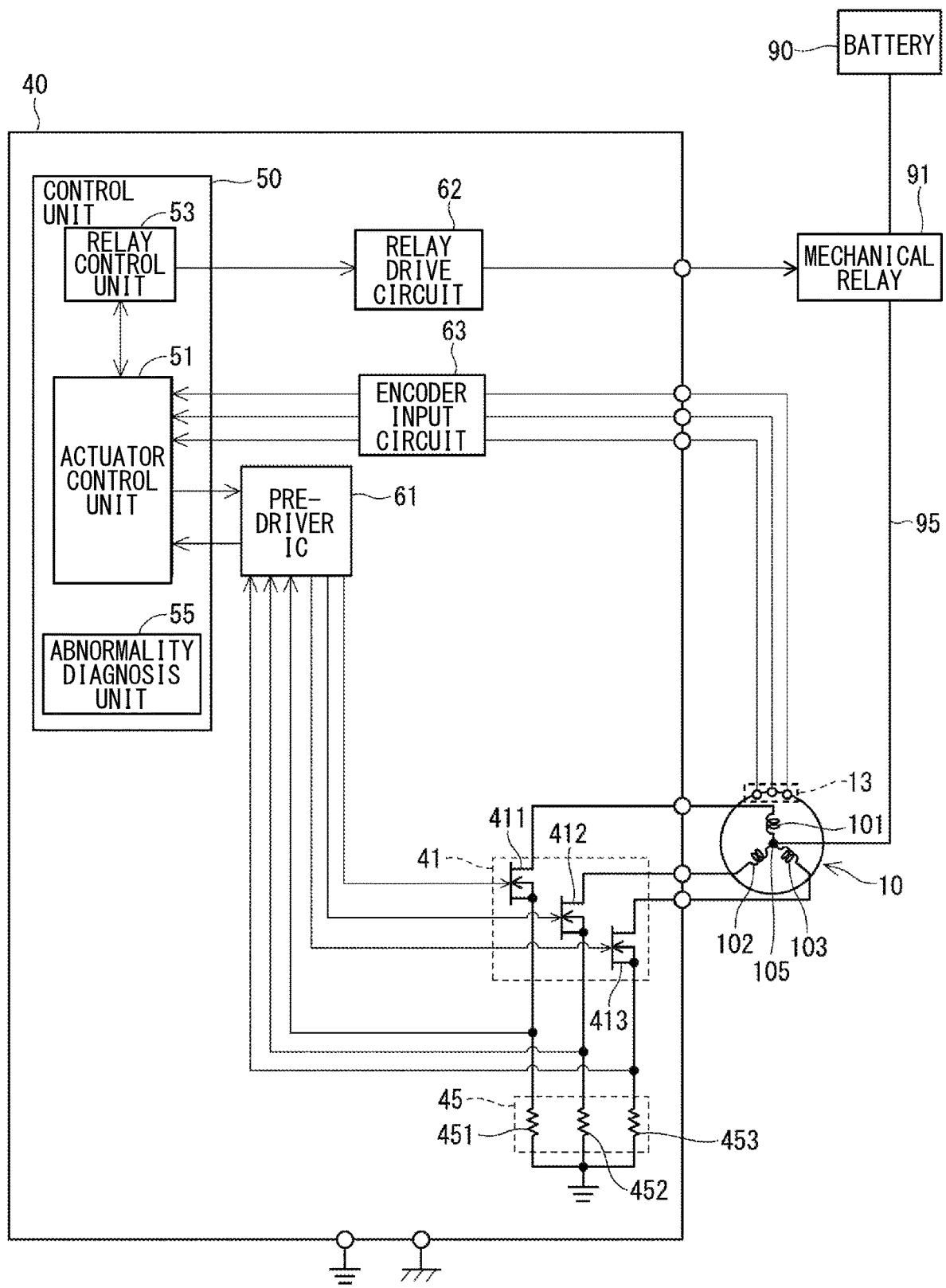
FIG. 3 is a block diagram showing a shift range switching device according to the first embodiment.
Figure 4:
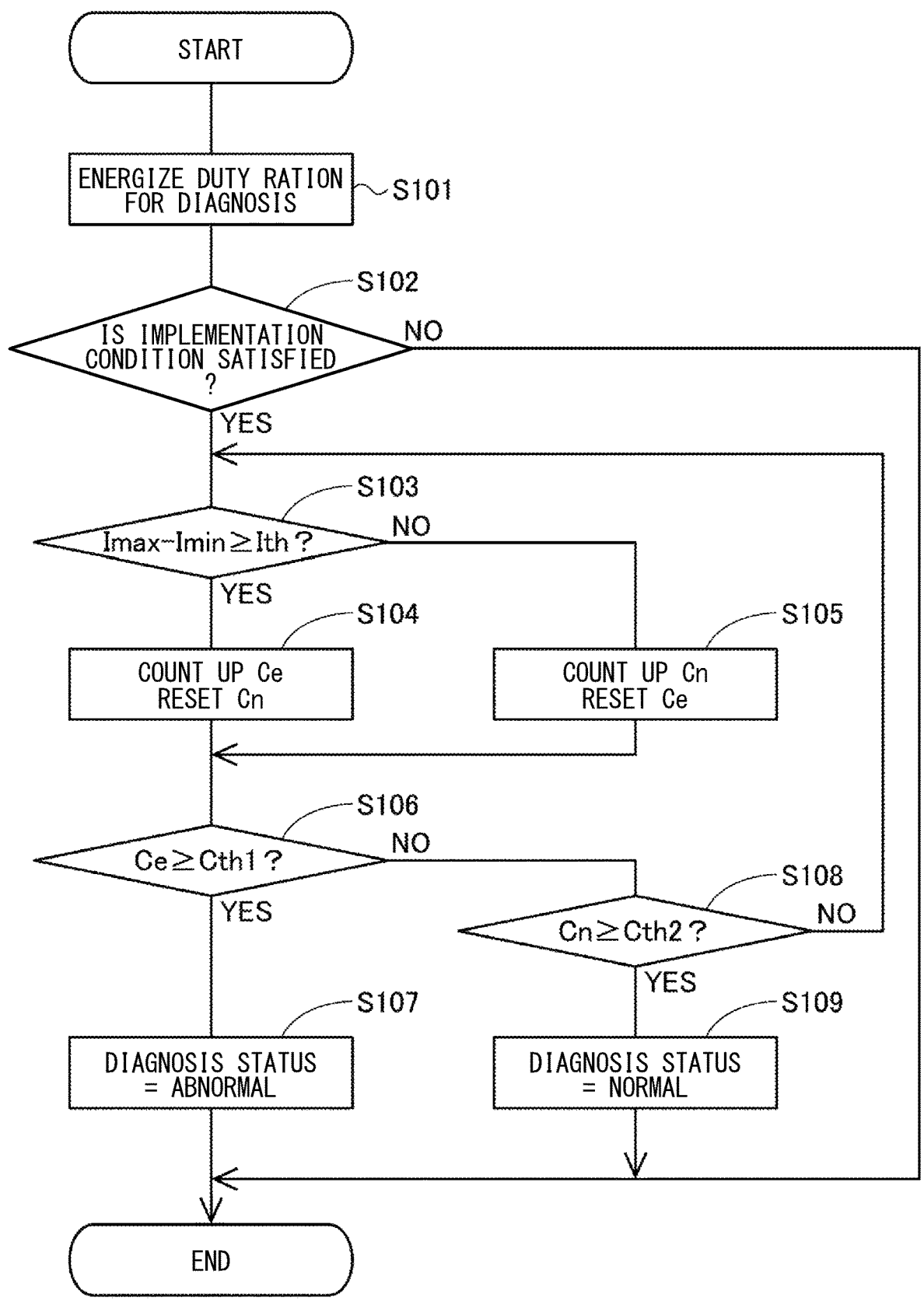
FIG. 4 is a flowchart illustrating an abnormality diagnosis process according to the first embodiment.

A motor control device according to a first embodiment of the present disclosure is shown in FIGS. 1 to 4. As shown in FIGS. 1 to 3, a shift-by-wire system 1 which is a shift range switching system includes a motor 10, a detent mechanism 20, a parking lock mechanism 30, a shift range switching device 40 as a motor control device, and the like.

The motor 10 rotates by being supplied with electric power from a battery 90 mounted on a vehicle (not shown), and functions as a drive source for the detent mechanism 20. The motor 10 is, for example, a switched reluctance motor, but may be something other than the switched reluctance motor.

As shown in FIG. 3, the motor 10 has motor windings 101 to 103. A drive circuit 41 is provided on one end side of the motor windings 101 to 103. The other end side of the motor windings 101 to 103 is connected by a connection portion 105. The connection portion 105 is connected to the battery 90 by an upper side bus 95. A mechanical relay 91 is provided on the upper side bus 95. The motor 10 of the present embodiment is a low-side drive motor in which the drive circuit 41 is provided on the low potential side. An on/off operation of the mechanical relay 91 is controlled based on a drive signal from a relay drive circuit 62. In the present embodiment, the mechanical relay 91 is used as the power relay, but a semiconductor element relay or the like may be used instead of the mechanical relay.

An encoder 13 detects a rotational position of the motor 10. The encoder 13 is, for example, a magnetic rotary encoder and is made up of a magnet that rotates integrally with the rotor, a magnetic detection hall integrated circuit (IC), and the like. The encoder 13 outputs an encoder signal which is an A-phase, B-phase, and C-phase pulse signal at predetermined angles in synchronization with the rotation of the rotor. The encoder signal is input to the control unit 50 via an encoder input circuit 63.

As shown in FIG. 2, a speed reducer 14 is provided between a motor shaft of the motor 10 and an output shaft 15 to decelerate the rotation of the motor 10 and output the decelerated rotation to the output shaft 15. As a result, the rotation of the motor 10 is transmitted to the detent mechanism 20. An output shaft sensor 16 for detecting an angle of the output shaft 15 is provided on the output shaft 15. The output shaft sensor 16 is a potentiometer, for example.

As shown in FIG. 1, the detent mechanism 20 includes a detent plate 21, a detent spring 25 and the like. The detent mechanism 20 transmits a rotational drive force output from the speed reducer 14 to a manual valve 28 and a parking lock mechanism 30.

The detent plate 21 is fixed to the output shaft 15 and driven by the motor 10. The detent plate 21 has a pin 24 protruding in parallel with the output shaft 15. The pin 24 is connected to the manual valve 28. The detent plate 21 is driven by the motor 10, whereby the manual valve 28 reciprocates in an axial direction. That is, the detent mechanism 20 converts the rotational motion of the motor 10 into a linear motion and transmits the linear motion to the manual valve 28. The manual valve 28 is provided on a valve body 29. When the manual valve 28 moves back and forth in the axial direction to switch hydraulic pressure supply paths, which are lead to a hydraulic clutch (not shown), thereby to switch an engagement state of the hydraulic clutch. In this way, the shift range is switched.

The detent plate 21 is provided with two valley portions 211 and 212 at portions close to the detent spring 25. In the present embodiment, the valley portion far from the base of the detent spring 25 is the valley portion 211, and the valley portion closer to the base is the valley portion 212. In the present embodiment, the valley portion 211 corresponds to a P range, and the valley portion 212 corresponds to a NotP range other than the P range.

The detent spring 25 is an elastically deformable plate-like member, and is provided with a detent roller 26 at a tip of the detent spring 25. The detent spring 25 urges the detent roller 26 toward the center of rotation of the detent plate 21. When a rotational force equal to or greater than a predetermined force is applied to the detent plate 21, the detent spring 25 is elastically deformed, and the detent roller 26 moves between the valley portions 211 and 212. When the detent roller 26 is fitted into any one of the valley portions 211 and 212, the swinging motion of the detent plate 21 is regulated, the axial position of the manual valve 28 and the state of the parking lock mechanism 30 are determined, and the shift range of an automatic transmission 5 is fixed.

The parking lock mechanism 30 includes a parking rod 31, a conical member 32, a parking lock pawl 33, a shaft part 34 and a parking gear 35. The parking rod 31 is formed in a substantially L-shape. The parking rod 31 is fixed to the detent plate 21 on a side of one end 311. The conical member 32 is provided to the other end 312 of the parking rod 31. The conical member 32 is formed to reduce in diameter toward the other end 312. When the detent plate 21 rotates in the direction in which the detent roller 26 fits into a recess corresponding to the P range, the conical member 32 moves in the direction of the arrow P.

The parking lock pole 33 comes into contact with a conical surface of the conical member 32 and is provided so as to be swingable around the shaft part 34. On the parking gear 35 side of the parking lock pole 33, a protrusion 331 that can mesh with the parking gear 35 is provided. When the conical member 32 moves in the direction of the arrow P due to the rotation of the detent plate 21, the parking lock pole 33 is pushed up and the protrusion 331 and the parking gear 35 mesh with each other. On the other hand, when the conical member 32 moves in the direction of the arrow NotP, the meshing between the protrusion 331 and the parking gear 35 is released.

The parking gear 35 is provided on an axle (not shown) and is enabled to mesh with the protrusion 331 of the parking lock pawl 33. When the parking gear 35 meshes with the protrusion 331, rotation of the axle is restricted. When the shift range is one of the ranges (Not P range) other than the P range, the parking gear 35 is not locked by the parking lock pawl 33. Therefore, the rotation of the axle is not restricted by the parking lock mechanism 30. When the shift range is the P range, the parking gear 35 is locked by the parking lock pawl 33 and the rotation of the axle is restricted.

As shown in FIGS. 2 and 3, the shift range switching device 40 includes the drive circuit 41, the control unit 50, and the like. The drive circuit 41 has three drive elements 411 to 413, each of which is provided on the ground side of the motor windings 101 to 103 of each phase. The on/off operation of the drive elements 411 to 413 is controlled according to a drive signal output from a pre-driver IC 61.

A current detection unit 45 is provided between the drive circuit 41 and the ground. The current detection unit 45 has three current detection resistors 451 to 453 that detect the current of each phase of the motor windings 101 to 103. A voltage between the current detection resistors 451 to 453 and the drive elements 411 to 413 is input to the control unit 50 via the pre-driver IC 61 as a detection value related to each phase current of the motor windings 101 to 103.

The control unit 50 is mainly composed of a microcomputer and the like, and internally includes, although not shown in the figure, a CPU, a ROM, a RAM, an I/O, a bus line for connecting these components, and the like. Each processing executed by each of the control unit 50 may be software processing or may be hardware processing. The software processing may be implemented by causing the CPU to execute a program. The program may be stored beforehand in a memory device such as a ROM, that is, in a computer-readable, non-transitory, tangible storage medium. The hardware processing may be implemented by a special purpose electronic circuit.

The control unit 50 controls the switching of the shift range by controlling the drive of the motor 10 based on the driver's request shift range, a signal from a brake switch, a vehicle speed, and the like. The control unit 50 controls the drive of a shift hydraulic control solenoid 6 based on a vehicle speed, an accelerator opening degree, a driver requested shift range, and the like. The shift hydraulic control solenoid 6 is controlled to manipulate a shift stage. The number of the shift hydraulic pressure control solenoids 6 is determined according to the shift stage or the like. In the present embodiment, one control unit 50 controls the drive of the motor 10 and the solenoid 6, but a motor ECU for controlling the motor 10 and an AT-ECU for controlling the solenoid may be separated from each other.

The control unit 50 has an actuator control unit 51, a relay control unit 53, an abnormality diagnosis unit 55, and the like as functional blocks. The actuator control unit 51 controls a drive operation of the motor 10 by controlling the on/off operation of the drive elements 411 to 413. The relay control unit 52 controls the on/off operation of the mechanical relay 91.

The abnormality diagnosis unit 55 detects an abnormality in the current detection unit 45. In the present embodiment, in particular, a drift abnormality of the current detection resistors 451 to 453 that causes a current deviation is detected. The abnormality diagnosis process of the present embodiment will be described with reference to the flowchart of FIG. 4. This process is executed at a predetermined cycle by an initial check in the control unit 50. Hereinafter, "step" in step S101 is omitted, and is simply referred to as a symbol "S."

In S101, the control unit 50 controls the on/off operation of the drive elements 411 to 413 with a duty ratio for diagnosis, and energizes all the phases for a predetermined time. The duty ratio for diagnosis shall be the same value for all phases. In S102, the abnormality diagnosis unit 55 determines whether or not the diagnosis implementation condition is satisfied. As the diagnosis implementation condition, when an output of the motor relay is on, the all-phase output of the energization register is on for a predetermined time, and a diagnosis status is not "abnormal", it is determined that the diagnosis implementation condition is satisfied. When it is determined that the diagnosis implementation condition is not satisfied (S102: NO), the process after S103 is skipped, and the abnormality determination of the current sensor is cancelled. When it is determined that the diagnosis implementation condition is satisfied (S102: YES), the process proceeds to S103.

In S103, the abnormality diagnosis unit 55 determines whether or not a difference between a maximum current Imax and a minimum current Imin is equal to or greater than an abnormality determination threshold value Is. Here, the maximum current Imax is the maximum value of each phase current Iu, Iv, Iw based on the detected values of the current detection resistors 451 to 453, and the minimum current Imin is the minimum value of each phase current Iu, Iv, Iw. When it is determined that the difference between the maximum current Imax and the minimum current Imin is equal to or greater than the abnormality determination threshold value Is (S103: YES), the process proceeds to S104, an abnormality counter Ce is counted up, and a normal counter Cn is reset. When it is determined that the difference between the maximum current Imax and the minimum current Imin is less than the abnormality determination threshold value ls (S103: NO), the process proceeds to S105, the normal counter Cn is counted up, and the abnormality counter Ce is reset.

In S106 which proceeds after S104 or S105, the abnormality diagnosis unit 55 determines whether or not the abnormality counter Ce is equal to or higher than a first determination threshold value Cth1. When it is determined that the abnormality counter Ce is equal to or higher than the first determination threshold value Cth1 (S106: YES), the process proceeds to S107 and a diagnosis status is set to abnormal. When it is determined that the abnormality counter Ce is smaller than the first determination threshold value Cth1 (S106: NO), the process proceeds to S108.

In S108, the abnormality diagnosis unit 55 determines whether or not the normal counter Cn is equal to or higher than a second determination threshold value Cth2. The first determination threshold value Cth1 related to the abnormality determination and the second determination threshold value Cth2 related to the normal determination may have the same value or different values. When it is determined that the normal counter Cn is smaller than the second determination threshold value Cth2 (S108: NO), the process returns to S103. When it is determined that the normal counter Cn is equal to or higher than the second determination threshold value Cth2 (S108: YES), the process proceeds to S109 and the diagnostic status is set to normal.

In the configuration where the current is detected on the low potential side of the drive circuit 41 in the low-side drive motor 10 in which the drive circuit 41 is on the low potential side of the motor windings 101 to 103, when the same duty ratio is specified for all phases, if the current detection resistors 451 to 453 are normal, the respective phase currents Iu, Iv, and Iw are theoretically equal. Therefore, in the present embodiment, the duty ratio for diagnosis is specified for all phases, and the abnormality of the current detection unit 45 is determined based on the difference between the maximum current Imax and the minimum current Imin. As a result, it is possible to detect an abnormality of the current detection unit 45 such as a drift abnormality with a relatively simple process without providing a separate sensor for detecting the bus current.

As described above, the shift range switching device 40 includes the motor 10, the drive circuit 41, the current detection unit 45, and the control unit 50. The motor 10 has a plurality of phases of motor windings 101 to 103. The drive circuit 41 has drive elements 411 to 413 corresponding to each phase of the motor windings 101 to 103, and is provided on the low potential side of the motor windings 101 to 103. The current detection unit 45 has current detection resistors 451 to 453 corresponding to each phase of the motor windings 101 to 103, and is provided on the low potential side of the drive circuit 41 provided on the low potential side of the motor windings 101 to 103.

The control unit 50 includes the actuator control unit 51 and the abnormality diagnosis unit 55. The actuator control unit 51 controls a drive operation of the motor 10 by controlling the on/off operation of the drive elements 411 to 413. The abnormality diagnosis unit 55 diagnoses an abnormality in the current detection unit 45. Here, the concept of "abnormality of the current detection unit" includes not only the abnormality of the current detection resistors 451 to 453 themselves but also the abnormality of the wiring and the like related to the current detection.

The abnormality diagnosis unit 55 determines that the current detection unit 45 is abnormal, when the difference between the maximum current Imax, which is the maximum value of the phase current when the same duty ratio is commanded to each phase, and the minimum current lmin, which is the minimum value of the phase current when the same duty ratio is commanded to each phase, is equal to or greater than the abnormality determination threshold ls. Thereby, the abnormality of the current detection unit 45 can be appropriately diagnosed.

The shift range switching device 40 is applied to the shift-by-wire system 1 that switches the shift range by controlling the drive of the motor 10. For example, by performing an abnormality diagnosis of the current detection unit 45 by an initial check or the like, it is possible to prevent a malfunction at the time of range switching due to an abnormality of the current detection unit 45.

Second Embodiment

Figure 5:
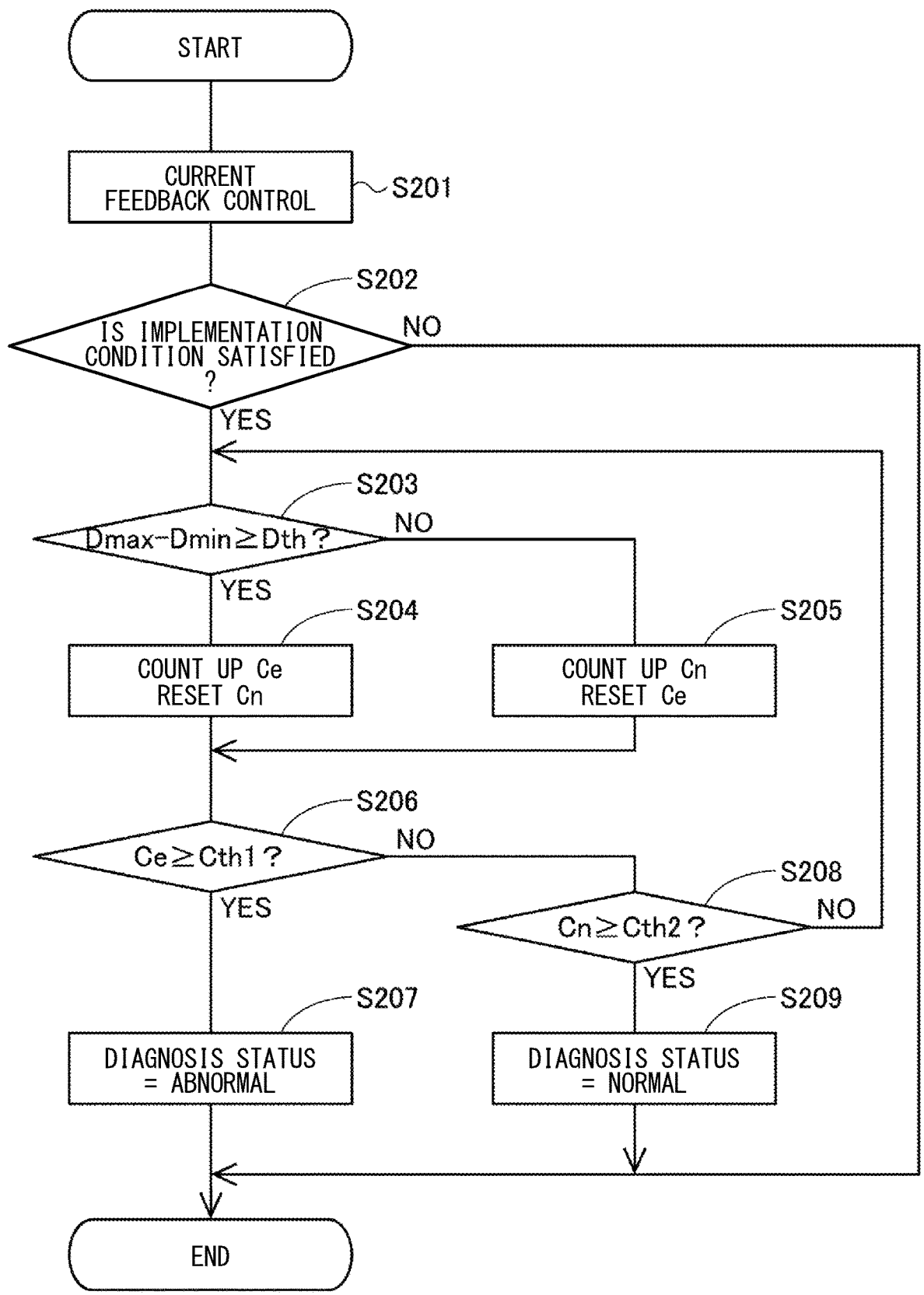
FIG. 5 is a flowchart illustrating an abnormality diagnosis process according to a second embodiment.

A second embodiment is shown in FIG. 5. In the present embodiment, the abnormality diagnosis process is different, and this point will be mainly described. The abnormality diagnosis process of the present embodiment will be described with reference to the flowchart of FIG. 5.

In S201, the control unit 50 sets a target current value for diagnosis, and energizes for a predetermined time by current feedback control. The target current value for diagnosis shall be the same value for all phases. The process of S202 is the same as the process of S102 in FIG. 4, and when it is determined that the diagnosis implementation condition is not satisfied (S202: NO), the processes after S203 are skipped, and when it is determined that the diagnosis implementation condition is satisfied (S202: YES), the process proceeds to S203.

In S203, the abnormality diagnosis unit 55 determines whether or not the difference between the maximum duty Dmax and the minimum duty Dmin is equal to or greater than the abnormality determination threshold value Dth. Here, the maximum duty Dmax is the maximum value of the duty command values Du, Dv, Dw of each phase, and the minimum duty Dmin is the minimum value of the duty command values Du, Dv, Dw of each phase. When it is determined that the difference between the maximum duty Dmax and the minimum duty Dmin is equal to or greater than the abnormality determination threshold value Dth (S203: YES), the process proceeds to S204. When it is determined that the difference between the maximum duty Dmax and the minimum duty Dmin is smaller than the abnormality determination threshold value Dth (S203: NO), the process proceeds to S205. The processes of S204 to S209 are the same as the processing of S104 to S109 in FIG. 4.

In the present embodiment, in the configuration where the current is detected on the low potential side of the drive circuit 41 in the low-side drive motor 10, when the same current command is instructed to all phases and current feedback control is performed, if the current detection resistors 451 to 453 are normal, the duty command values Du, Dv, Dw of each phase are theoretically equal. Therefore, in the present embodiment, the current feedback control is performed based on the target current value for diagnosis, and the abnormality of the current detection unit 45 is determined based on the difference between the maximum duty Dmax and the minimum duty Dmin. As a result, it is possible to detect an abnormality of the current detecting unit 45 such as a drift abnormality without providing a separate sensor for detecting the bus current. In addition, the abnormality of the current detection unit 45 can be detected with relatively high accuracy without being affected by the current fluctuation due to extrinsic conditions and the like.

In the present embodiment, the abnormality diagnosis unit 55 determines that the current detection unit 45 is abnormal, if a difference between the maximum duty Dmax which is the maximum value of each phase duty command value when the current feedback control is performed and the minimum duty which is the minimum value of each phase duty command value when the current feedback control is performed is equal to or greater than the abnormality determination threshold value Dth. As a result, the abnormality of the current detection unit 45 can be detected with relatively high accuracy. In addition, the same effects as that of the embodiment described above can be obtained.

Third Embodiment

Figure 6:
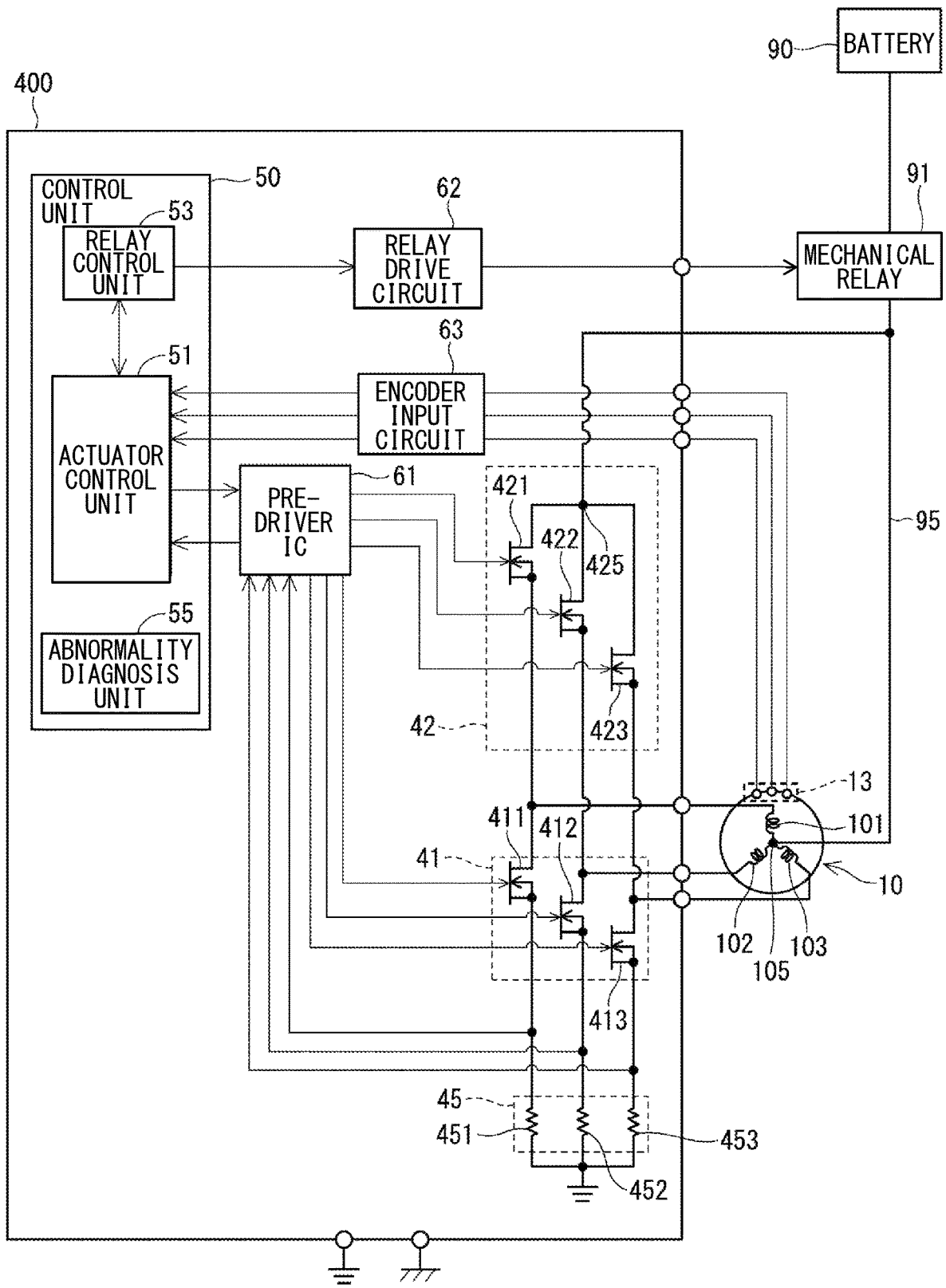
FIG. 6 is a block diagram showing a shift range switching device according to a third embodiment.

A third embodiment is shown in FIG. 6. The shift range switching device 400 as the motor control device of the present embodiment is provided with a reflux circuit 42. The reflux circuit 42 has three reflux elements 421 to 423 and is provided on the high potential side of the drive circuit 41. Specifically, the reflux elements 421 to 423 are provided on the high potential side of a connecting part between the drive elements 411 to 413 of the drive circuit 41 and the motor windings 101 to 103. Further, the high potential side of the reflux elements 421 to 423 is connected by the connection portion 425 and connected to the upper bus 95 by the common connection line 427.

The on/off operation of the reflux elements 421 to 423 is controlled by the actuator control unit 51 via the pre-driver IC 61. By turning on the reflux elements 421 to 423 at the timing when the corresponding drive elements 411 to 413 are not turned on, the energy on the motor 10 side is returned to the upper bus 95 side. As a result, heat generation of the drive elements 411 to 413 can be suppressed. The abnormality diagnosis process may be performed by the process of either the first embodiment or the second embodiment.

In the present embodiment, the shift range switching device 40 further includes the reflux circuit 42 having reflux elements 421 to 423 provided corresponding to each phase of the drive elements 411 to 413. One end of the motor windings 101 to 103 is connected to the drive elements 411 to 413, and the other end is connected by the connection portion 105. One end of the reflux elements 421 to 423 is connected to the connecting part between the drive elements 411 to 413 and the motor windings 101 to 103, and the other end is connected to the connection portion 105.

By turning on the reflux elements 421 to 423 at the timing when the drive elements 411 to 413 of the same phase are off and returning the energy, the heat generation of the drive elements 411 to 413 can be suppressed. In addition, the same effects as those of the above embodiment can be obtained.

In the embodiment, the shift-by-wire system 1 corresponds to the "shift range switching system", the shift range switching devices 40 and 400 correspond to the "motor control device", and the diagnostic target current corresponds to the "current command value".

Other Embodiments

In the above embodiment, the motor is a three-phase motor including a three-phase motor winding. In another embodiment, the number of phases of the motor winding may be two phases or four or more phases.

In the above embodiment, the drive circuit is provided on the low potential side of the motor winding, so-called low-side drive motor. In another embodiment, the drive circuit may be provided on the high potential side of the motor winding, so-called high-side drive motor. In the case of a high-side drive motor, the current detection unit is provided on the high potential side of the drive circuit, that is, between the drive circuit and the upper bus. Even with this configuration, it is possible to diagnose an abnormality in the current detection unit by the same abnormality diagnosis process as in the above embodiment.

In the embodiment described above, the detent plate is provided with two recesses. In another embodiment, the number of recesses is not limited to two, and for example, a recess may be provided for each range. The shift range switching mechanism and the parking lock mechanism or the like may be different from those in the embodiments described above.

In the embodiment described above, the speed reducer is placed between the motor shaft and the output shaft. Although the detail of the speed reducer is not mentioned in the above embodiment, the speed reducer may have any configuration, such as one using a cycloid gear, a planetary gear, or a spur gear that transmits a torque from a speed reduction mechanism substantially coaxial with the motor shaft to the drive shaft, and one using these gears in combination. As another embodiment, the speed reducer between the motor shaft and the output shaft may be omitted, or a mechanism other than the speed reducer may be provided. In the above embodiments, the motor control device is applied to a shift range switching system. In another embodiment, the motor control device may be applied to a device except for the shift range switching system.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. A motor control device, comprising:
a motor having a multi-phase motor winding;
a drive circuit having drive elements corresponding to each phase of the motor winding and provided on either a low potential side or a high potential side of the motor winding;
a current detection unit having current detection resistors corresponding to each phase of the motor winding, and provided on a low potential side of the drive circuit provided on the low potential side of the motor winding, or on a high potential side of the drive circuit provided on the high potential side of the motor winding; and
a control unit having an actuator control unit configured to control a drive of the motor by controlling an on/off operation of the drive element, and an abnormality diagnosis unit configured to diagnose an abnormality in the current detection unit,
wherein
the abnormality diagnosis unit determines that the current detection unit is abnormal when a difference between a maximum value and a minimum value of a phase current when a same duty ratio is commanded to each phase is equal to or more than an abnormality determination threshold value;
the motor control device further comprises a reflux circuit having reflux elements provided corresponding to each phase of the drive elements,
one end of the motor winding is connected to the drive element, and the other end is connected by a connection portion, and one end of the reflux element is connected to a connecting part between the drive element and the motor winding, and the other end is connected to the connection portion.

2. A motor control device, comprising:
a motor having a multi-phase motor winding;
a drive circuit having drive elements corresponding to each phase of the motor winding and provided on either a low potential side or a high potential side of the motor winding;
a current detection unit having current detection resistors corresponding to each phase of the motor winding, and provided on a low potential side of the drive circuit provided on the low potential side of the motor winding, or on a high potential side of the drive circuit provided on the high potential side of the motor winding; and
a control unit having an actuator control unit configured to control a drive of the motor by controlling an on/off operation of the drive element, and an abnormality diagnosis unit configured to diagnose an abnormality in the current detection unit,
wherein
the abnormality diagnosis unit determines that the current detection unit is abnormal when a difference between a maximum value and a minimum value duty command value of each phase when a same current command value is commanded to each phase and a current feedback control is performed is equal to or larger than an abnormality determination threshold value,
the motor control device further comprises: reflux circuit having reflux elements provided corresponding to each phase of the drive elements, and
one end of the motor winding is connected to the drive element, and the other end is connected by a connection portion.

3. The motor control device according to claim 1, wherein the motor control device is applied to a shift range switching system that switches a shift range by controlling the drive of the motor.

4. The motor control device according to claim 2, wherein one end of the reflux element is connected to a connecting part between the drive element and the motor winding, and the other end is connected to the connection portion.

5. The motor control device according to claim 2, wherein the motor control device is applied to a shift range switching system that switches a shift range by controlling the drive of the motor.

6. A motor control device, comprising:
a motor having a multi-phase motor winding;
a drive circuit having drive elements corresponding to each phase of the motor winding and provided on either a low potential side or a high potential side of the motor winding;
a current detection unit having current detection resistors corresponding to each phase of the motor winding, and provided on a low potential side of the drive circuit provided on the low potential side of the motor winding, or on a high potential side of the drive circuit provided on the high potential side of the motor winding; and
a control unit having a computer including a processor and a memory that stores instructions configured to, when executed by the processor, cause the processor to control a drive of the motor by controlling an on/off operation of the drive element, diagnose an abnormality in the current detection unit, and
determine that the current detection unit is abnormal when a difference between a maximum value and a minimum value of a phase current when a same duty ratio is commanded to each phase is equal to or more than an abnormality determination threshold value;
the motor control device further comprises a reflux circuit having reflux elements provided corresponding to each phase of the drive elements,
one end of the motor winding is connected to the drive element, and the other end is connected by a connection portion, and
one end of the reflux element is connected to a connecting part between the drive element and the motor winding, and the other end is connected to the connection portion.

\* \* \* \* \*